(12) United States Patent
Bauskar et al.

(10) Patent No.: US 11,520,802 B2
(45) Date of Patent: Dec. 6, 2022

(54) SYSTEMS AND METHODS FOR DATA FORMAT CONVERSION

(71) Applicant: CU Cooperative Systems, Inc., Rancho Cucamonga, CA (US)

(72) Inventors: Ashwini Bauskar, Rancho Cucamonga, CA (US); Anne Fairchild, Rancho Cucamonga, CA (US); Terry Pierce, Rancho Cucamonga, CA (US); Kathy Snider, Rancho Cucamonga, CA (US); Bruce Dragt, Rancho Cucamonga, CA (US)

(73) Assignee: CU Cooperative Systems, Inc., Rancho Cucamonga, CA (US)

( * ) Notice: Subject to any disclaimer, the term of this patent is extended or adjusted under 35 U.S.C. 154(b) by 69 days.

(21) Appl. No.: 17/244,316

(22) Filed: Apr. 29, 2021

(65) Prior Publication Data

US 2022/0350815 A1 Nov. 3, 2022

(51) Int. Cl.
*G06F 16/25* (2019.01)
*G06F 3/06* (2006.01)
*G06F 16/178* (2019.01)
*G06Q 20/10* (2012.01)

(52) U.S. Cl.
CPC ........... *G06F 16/258* (2019.01); *G06F 3/061* (2013.01); *G06F 3/067* (2013.01); *G06F 3/0661* (2013.01); *G06F 16/1794* (2019.01); *G06Q 20/10* (2013.01)

(58) Field of Classification Search
CPC .... G06F 16/258; G06F 16/1794; G06F 3/061; G06F 3/0661; G06F 3/067; G06Q 20/10
See application file for complete search history.

(56) References Cited

U.S. PATENT DOCUMENTS

| | | | | |
|---|---|---|---|---|
| 7,624,041 | B2* | 11/2009 | Postrel | G06Q 30/0239 |
| | | | | 705/14.27 |
| 10,872,349 | B1* | 12/2020 | Hijirida | G06Q 30/0227 |
| 2010/0280896 | A1* | 11/2010 | Postrel | G06Q 30/0228 |
| | | | | 705/14.29 |
| 2012/0039469 | A1* | 2/2012 | Mueller | H04L 63/0428 |
| | | | | 380/252 |
| 2014/0081736 | A1* | 3/2014 | Blackhurst | G06Q 30/0226 |
| | | | | 705/14.3 |
| 2017/0278125 | A1* | 9/2017 | Tietzen | G06Q 30/0229 |

(Continued)

*Primary Examiner* — Alford W Kindred
*Assistant Examiner* — Tiffany Thuy Bui
(74) *Attorney, Agent, or Firm* — Foley & Lardner LLP

(57) ABSTRACT

A method comprising receiving, via a first application and from a client device, a request for a data format conversion of transaction data; responsive to receiving the request, transmitting, via the first application, a verification request comprising an institution identifier and an account identifier to a second application, receiving, via the first application from the second application, verification that the first account identifier is associated with a valid user account; converting, via the first application, a portion of the transaction data from a first format to a second format; transmitting, via the first application, an update request to the second application, receipt of the update request causing the second application to (1) select an established connection with an institution, and (2) initiate an update transaction with the institution based on the converted transaction data; receiving, via the first application, an indication that the update transaction was successful.

18 Claims, 4 Drawing Sheets

(56) References Cited

U.S. PATENT DOCUMENTS

| | | | |
|---|---|---|---|
| 2020/0097991 A1* | 3/2020 | Pistilli | G06Q 20/065 |
| 2021/0398211 A1* | 12/2021 | Maathur | G06Q 20/381 |
| 2022/0101319 A1* | 3/2022 | Gilliam, III | G06Q 20/405 |

* cited by examiner

SYSTEMS AND METHODS FOR DATA FORMAT CONVERSION

BACKGROUND

Deposits of funds for transaction data conversions (e.g., point conversions) generally takes days at a minimum. The delay in processing these funds often stems from the industry use of an ACH (automated clearinghouse), which is a batch processing system used to process large amounts of automated payment transactions cleared via the Federal Reserve. Transactions performed through the ACH can often take a large amount of time because of the number of parties involved, the data file exchange process between the parties, and the sheer amount of data the ACH processors process. Such processing often includes exchanging signals and collecting data from a variety of different sources. The delay caused by the ACH bottleneck for data format conversions can cause data to be sitting in a data storage facility days after users submit requests for data conversions while the ACH communicates with outside parties, often using batch processing techniques for each such communication. The ACH process can burden the ACH processors given the amount of computer resources that are required to facilitate the signals that the ACH processors transmit with outside parties and the difficulties that are involved in correcting errors that can occur during batch processing.

SUMMARY

In accordance with some aspects of the disclosure a method is disclosed. The method may include receiving, by one or more processors via a first application and from a client device, a request for a data format conversion, the request comprising transaction data, an institution identifier, and a first account identifier associated with a first user account of a user; responsive to receiving the request, transmitting, by the one or more processors via the first application, a verification request comprising the institution identifier and the account identifier to a second application, receipt of the verification request causing the second application to determine whether the first account identifier and the institution identifier are associated with a valid user account; after the second application determines the first account identifier is associated with a valid user account, receiving, by the one or more processors via the first application from the second application, verification that the first account identifier is associated with a valid user account; responsive to receiving the verification, converting, by the one or more processors via the first application, a portion of the transaction data from a first format to a second format identified in the request for a data format conversion; transmitting, by the one or more processors via the first application, an update request to the second application, the update request comprising the converted transaction data, the institution identifier, and the first account identifier or a second account identifier of a second user account associated with the user, receipt of the update request causing the second application to (1) select an established connection with an institution from a plurality of established connections with institutions based on the institution identifier, and (2) initiate an update transaction with the institution based on the transaction data; receiving, by the one or more processors via the first application, an indication that the update transaction was successful; and responsive to receiving the indication, generating, by the one or more processors via the first application, a record indicating the update transaction was successful.

In accordance with some aspects of the disclosure a non-transitory computer-readable storage medium is disclosed. The non-transitory computer-readable storage medium may store executable instructions that, when executed by one or more processors connected to a communications network, cause the one or more processors to receive, via a first application and from a client device, a request for a data format conversion, the request comprising transaction data, an institution identifier, and a first account identifier associated with a first user account of a user; responsive to receiving the request, transmit, via the first application, a verification request comprising the institution identifier and the account identifier to a second application, receipt of the verification request causing the second application to determine whether the first account identifier and the institution identifier are associated with a valid user account; after the second application determines the first account identifier is associated with a valid user account, receive, via the first application from the second application, verification that the first account identifier is associated with a valid user account; responsive to receiving the verification, convert a portion of the transaction data from a first format to a second format identified in the request for a data format conversion; transmit, via the first application, an update request to the second application, the update request comprising the converted transaction data, the institution identifier, and the first account identifier or a second account identifier of a second user account associated with the user, receipt of the update request causing the second application to (1) select an established connection with an institution from a plurality of established connections with institutions based on the institution identifier, and (2) initiate an update transaction with the institution based on the transaction data; receive, via the first application, an indication that the update transaction was successful; and responsive to receiving the indication, generate, via the first application, a record indicating the update transaction was successful.

In accordance with some aspects of the disclosure another method is disclosed. The method may include establishing, by one or more processors via a first application, connections with a plurality of institutions over a communications network; receiving, by the one or more processors via the first application from a second application, a verification request comprising an institution identifier and a first account identifier associated with a first user account of a user, the second application sending the verification request responsive to receiving a data format conversion request comprising transaction data, the institution identifier, and the first account identifier from a client device; responsive to receiving the verification request, determining, by the one or more processors via the first application, whether the first account identifier and the institution identifier are associated with a valid user account; responsive to determining the first account identifier and the institution identifier are associated with a valid user account, transmitting, by the one or more processors via the first application to the second application, verification that the first account identifier and the institution identifier are associated with a valid user account, receipt of the verification causing the second application to convert a portion of the transaction data from a first format to a second format identified in the data format conversion request; receiving, by the one or more processors via the first application and from the second application, an update request, the update request comprising the converted transaction data, the institution identifier, and the first account identifier or a second account identifier of a second user account associated with the user; responsive to receiving the update request: selecting, by the one or more processors via the second application, an established connection with an institution based on the institution identifier, and initiating, by the one or more processors, an update transaction with the institution based on the converted transaction data; receiving, by the one or more processors via the first application from the institution, a first indication that the update transaction was successful; and responsive to receiving the first indication, transmitting, by the one or more processors via the first application, a second indication that the update transaction was successful to the second application.

The foregoing summary is illustrative only and is not intended to be in any way limiting. In addition to the illustrative aspects, embodiments, and features described above, further aspects, embodiments, and features will become apparent by reference to the following drawings and the detailed description.

Figure 1:
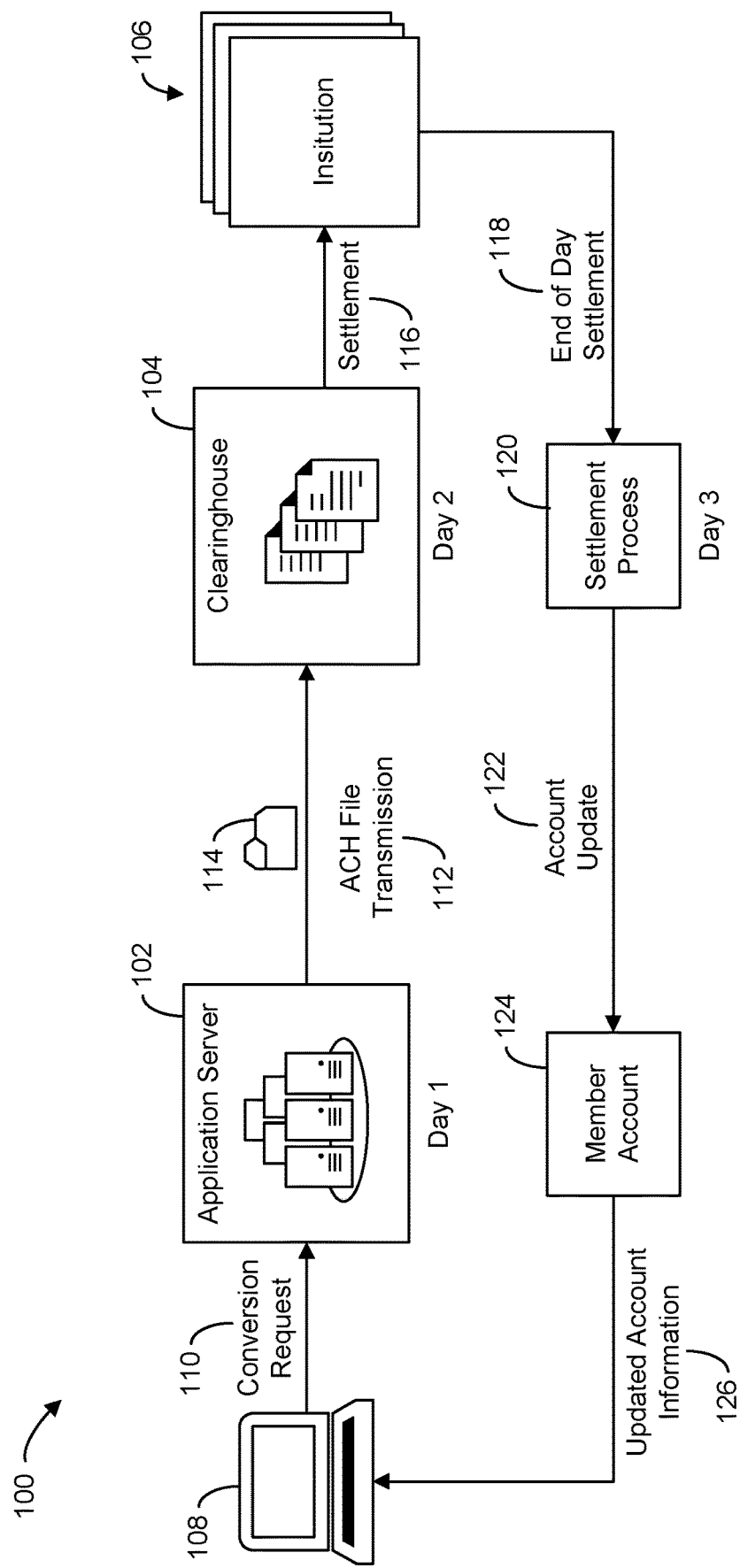
FIG. 1 is an example flow diagram of a data conversion system using an ACH process.

The foregoing and other features of the present disclosure will become apparent from the following description and appended claims, taken in conjunction with the accompanying drawings. Understanding that these drawings depict only several embodiments in accordance with the disclosure and are therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

A popular feature of account management systems is an incentive offered to "convert" any points that users have earned with transaction activities into different values and/or different formats. For example, as a user purchases items from various brick and mortar and/or online stores using one of his or her accounts, the user may accrue points that correspond to the purchase amounts. Typically, these points represent a percentage of the purchase price of the items (e.g., 1%, 2%, etc.). An account management system may maintain lists of such points for a large number of users which, in some cases, accrue the points through different institutions (e.g., financial institutions). A user may input a request to convert a user's points from a point format into another format (e.g., dollars or cents) and/or value, and the account management system may update the user's account with the converted value in the new format.

Account management systems not using the systems and methods described herein typically convert the points into a new format using an automated clearinghouse (ACH) process. ACH is often used to process electronic fund transactions, doing so daily using batch processing techniques. For each transaction using the ACH process, the network may send signals to additional parties for their approval to collect data that is necessary for the transaction to process successfully. The ACH process often involves sending these signals using batch processing techniques at pre-established time intervals, which can use a large amount of resources and may cause a significant slowdown in the amount of time it takes for an ACH processor to process each transaction.

Moreover, because the ACH process relies so heavily on batch processing, technical issues that are inherent to batch processing can often cause further slowdowns in converting points into new formats to update a user's account. For instance, if an error occurs when an ACH processor processes a batch of transactions (e.g., a typo causes a problem, the data for a transaction becomes corrupted, the system is not properly configured or updated, etc.), it can be difficult to debug the issue given the large amount of data that is processed at one time. These errors can often cause ACH processors to stop processing data while operators debug the system to determine and correct the error. This can create a queue of transactions to be processed if it takes operators a large amount of time to resolve the issue that runs into the time in which the next batch is scheduled to be processed.

Implementations of the systems and methods described herein can overcome the technical deficiencies of using the ACH process by using less resource-intensive and continuous processing techniques. The systems and methods enable data conversion processing in real-time through an account interface that connects a management server to institutions to perform conversions, thus avoiding the batch processing and batch file message exchanges of the ACH process. An application server may host an application that can communicate with a web page that enables users to request data conversions. The application can authenticate the user's account with the account interface to ensure the user or user account has the appropriate permissions (e.g., has an active account) for the requested conversion. In some embodiments, the user can select from a list of available accounts to perform the conversion. After determining the user has the appropriate permissions and, in some embodiments, has selected the account, the application can convert the points into a new format and send the converted data and an identifier of the user account to the account interface to initiate a deposit based on the converted data. The process can be performed in real-time without a processor performing batch processing or exchanging messages with third parties. Accordingly, the processors can perform the data conversion more quickly (by a few days), while using less processing resources, and while being less prone to errors that can stop processing when processing transactions using conventional ACH technique.

Furthermore, the initial authentication through the user account identifier adds an extra layer of security that is not available through the ACH technique. For example, the ACH technique often includes processing transactions regardless of whether the transactions were requested through an active account because ACH processors may not have access to account activity data and may receive the transaction data in a flat ACH file without any indication that the account is authenticated. A system implementing the methods described herein can improve data security by only processing transactions after authenticating the user using stored information about the user, an option that is not available in the ACH process.

Referring now to FIG. 1, an example flow diagram of an example process 100 for using an ACH process for processing a conversion transaction is shown. Process 100 can be performed by data processing systems that rely on an ACH process to perform data conversion transactions. For example, process 100 may be performed by an application server 102, a clearinghouse 104, and/or any number of institutions 106, as illustrated in FIG. 1. Process 100 may be initiated in an operation 110 when a client device 108 transmits a conversion request to application server 102. The conversion request may be a request to convert data from a point format (e.g., 1,000 points) to data in another format (e.g., 10 dollars) and may include transaction data (e.g., the data to be converted), user account information, the data formats for the conversion (e.g., dollars, ticket count, etc.), etc. Application server 102 may receive the request and convert the data to the new format identified in the request and, in operation 112, transmit an ACH file 114 to clearinghouse 104. ACH file 114 may be a file including a file header record, a batch header record, an entry detail record, a batch control and/or addenda record, and/or a file control record including data from the conversion request. ACH file 114 may indicate the transaction type as "deposit" via a deposit transaction code in the entry detail record of ACH file 114 to deposit the value converted from the initial value in the original format of the conversion request into the user account of the user that sent the initial conversion request. ACH file 114 may also include the amount to be deposited in the entry detail record. Through various computing devices, clearinghouse 104 may process ACH file 114 by transmitting signals to a merchant and/or one of institutions 106 to confirm ACH file 114 is authorized to be processed.

Upon receiving authorization from the merchant and/or institution, clearinghouse 104 may place ACH file 114 in a queue with other ACH files to be processed. Clearinghouse 104 may be configured to process ACH files in batches at set intervals given the amount of resources that are required (e.g., the resources that are required to evaluate the contents of the files) to process each of the records of the ACH files, transmit the signals to the respective institutions, and execute the transactions including transactions of multiple transaction types (e.g., credit transactions and debit transactions). Clearinghouse 104 may process batches of ACH files and send batch messages to the merchants and/or institutions 106 at set intervals, such as every day or every other day, which can often lead to ACH files sitting in queues for multiple days before the files are eventually processed. Upon processing ACH file 114, in operation 116, clearinghouse 104 may transmit a settlement signal to the respective institution that was identified in ACH file 114 to indicate clearinghouse 104 performed the requested processing.

The institution may receive the settlement signal and, in operation 118, perform a settlement process 120 to update the institution's internal records to indicate the settlement went through. Similar to how clearinghouse 104 uses batch processing to process ACH files and transmit messages, the institution may use batch processing to process the transaction at the end of the day with the other transactions that clearinghouse 104 has settled with the institution. Upon processing the transaction, in operation 122, the institution may update a user account 124 to indicate the institution settled the conversion or deposit. For example, the institution may increase a value in a user's account by aggregating the dollars that were converted from points in the conversion request from client device 108 with the current dollars in the account. In operation 126, the user may view the updated account information (e.g., the new dollar amount) in their account.

Unfortunately, by implementing the above-described process, processing a conversion request originating at a client device may take several days and require ACH processors to use a large amount of computer resources, including the resources that are required to communicate with multiple third parties and multiple institutions, to repeatedly process the same batched files after experiencing errors during processing, and to otherwise process a large amount of data in batches. Thus, there is a need for a new process in which transactions such as data conversions can be performed more quickly in real-time, using fewer computer resources, and in a manner that avoids the difficult debugging issues that can result from batch processing.

Figure 2:
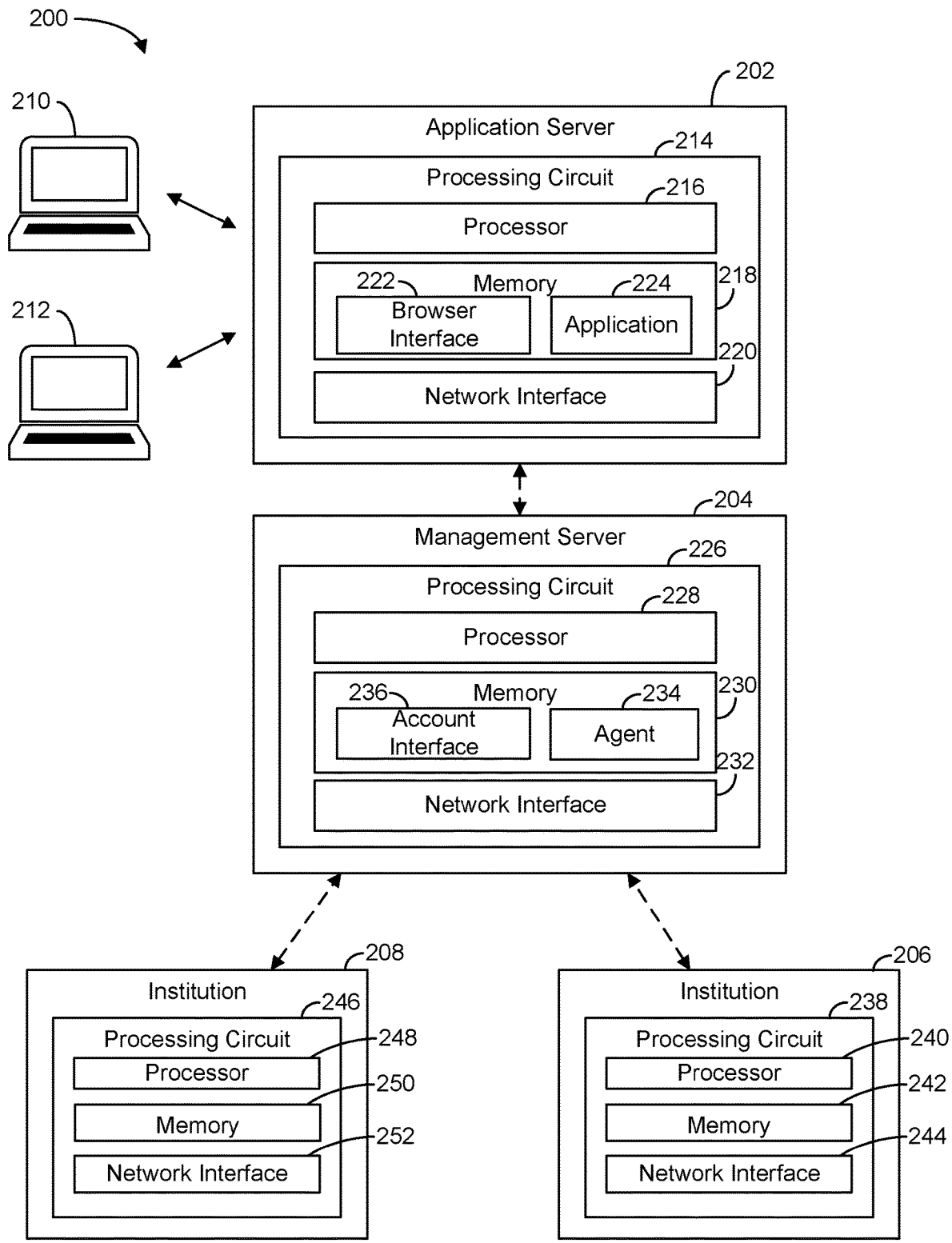
FIG. 2 is an example block diagram of a data conversion system using real-time data conversion technology, in accordance with some embodiments of the present disclosure.

Referring now to FIG. 2, an example block diagram of a data conversion system 200 is shown, in accordance with some embodiments of the present disclosure. Data conversion system 200 may be a system designed to overcome the aforementioned computing deficiencies and avoid using the batch processing and signal exchanging techniques that often delay performing transactions (e.g., data conversions) in an ACH process. Data conversion system 200 may enable a set of processors to process transactions more quickly and, in some cases, in real-time. Data conversion system 200 is shown to include an application server 202, a management server 204, institutions 206 and 208, and client devices 210 and 212. Each of components 202, 204, 206, 208, 210, and 212 may communicate over a synchronous or asynchronous network. Application server 202 and management server 204 may communicate with each other to facilitate authentication of a user that is requesting to convert values associated with the user's account into a new format and/or value and to perform such conversions.

In brief overview, to facilitate a data conversion, application server 202 may receive a data conversion request from client device 210 or client device 212, authenticate the user account that is associated with the data conversion request by communicating with management server 204, convert a portion of transaction data from a first format (e.g., points) into a second format (e.g., dollars and/or cents) identified in the data conversion request, and transmit the converted transaction data and account and institution identifiers that were included in the data conversion request to management server 204. Management server 204 may receive the transaction data and identifiers, select a connection that management server 204 previously established with institution 206 or institution 208 based on the institution identifier, and initiate an update request (e.g., a request to update the account associated with the account and institutions identifiers) with the selected institution 206 or 208 based on the converted data. Upon completion of the update (by the selected institution 206 or institution 208), management server 204 may send a notification to the requesting client device 210 or 212 through application server 202 indicating the conversion or update was successful. Data conversion system 200 and/or each of components 202, 204, 206, 208, 210, and 212 may comprise any number of components and may communicate in any manner.

Client devices 210 and 212 can include or execute browser applications to access web pages of institutions (e.g., financial institutions) and data conversion systems over a network (e.g., over the Internet). For example, client device 210 and 212 may execute a browser application to log in to a user's account (e.g., authenticate the user against account information for the user's account) to view financial data about the user's account on a user interface. The user may have accrued a number of points for the account through various purchases. To access and use these points, the user may select an option on the user interface to access a points system and log in to the points system using the user's point system credentials. From the points system web page, the user may select options to convert the points to money or other formats such as tickets (e.g., traveling tickets, event tickets, etc.), items for online or brick and mortar stores, coupons, etc. Upon receiving a user selection, the client device may send a conversion request including transaction data (e.g., a number of points to convert and/or a requested new format for the points), an identifier of an institution to perform the conversion, an account identifier of the user account that initiated the conversion (e.g., a user account of the points system or the user's account), etc., to application server 202 to complete the conversion.

Application server 202 may include a processing circuit 214. Processing circuit 214 may include a processor 216, a memory 218, and a network interface 220, in some embodiments. Processing circuit 214 may be implemented as a general-purpose processor, an application-specific integrated circuit ("ASIC"), one or more field-programmable gate arrays ("FPGAs"), a digital-signal-processor ("DSP"), circuits containing one or more processing components, circuitry for supporting a microprocessor, a group of processing components, or other suitable electronic processing components. Processor 216 may include an ASIC, one or more FPGAs, a DSP, circuits containing one or more processing components, circuitry for supporting a microprocessor, a group of processing components, or other suitable electronic processing components. In some embodiments, processor 216 may execute computer code stored in memory 218 to facilitate the activities described herein. Memory 218 may be any volatile or non-volatile computer-readable storage medium capable of storing data or computer code relating to the activities. According to an exemplary embodiment, memory 218 may include computer code modules (e.g., executable code, object code, source code, script code, machine code, etc.) for execution by processor 216. For example, memory 218 may include a browser interface 222 and/or an application 224.

Browser interface 222 may comprise instructions executable by one or more processors (e.g., processor 216) to communicate with browsers stored on client devices 210 and 212. For example, browser interface 222 may be an application programming interface. Browser interface 222 may be configured to receive the conversion request from client device 210 and send a signal to application 224 indicating the request and the data included in the request.

Application 224 may comprise instructions executable by one or more processors (e.g., processor 216) to communicate with management server 204 to authenticate the user account associated with the transaction request, convert the transaction data from a first format to a second format identified in the request, and send the converted transaction data to management server 204. Application 224 may receive the conversion request through browser interface 222 and transmit the user account identifier and the institution identifier to management server 204 for verification. Responsive to receiving an indication from management server 204 that there is not an active user account associated with the account identifier, application 224 may generate and/or transmit a record to client device 210 indicating the conversion was unsuccessful.

However, responsive to receiving an indication that there is a valid user account associated with the account identifier, application 224 may convert at least a portion of the transaction data (the value and/or format) from a first format (e.g., points) into a second format (e.g., dollars and/or cents) based on an identification of the second format in the conversion request. For example, application 224 may identify a format to convert points of the transaction data into from the transaction data or from a format identifier in the data conversion request. Application 224 may retrieve a format conversion policy from memory 230 (e.g., from a database stored in memory 230). A format conversion policy may include conversion rates (e.g., 100 points is 1 dollar, 1,000 points is a ticket, etc.). Application 224 may convert the points in the transaction data to the new format according to the conversion rates of the retrieved format conversion policy.

For example, application 224 may receive a request to convert 1000 points into a dollar format. Application 224 may identify the 1000 value and the dollar format from the request and retrieve a format conversion policy that includes rules for converting points into dollars. Application 224 may determine the conversion rate for converting points into dollars is 100 points to one dollar based on the conversion rate identified in the format conversion policy. Accordingly, application 224 may divide the 1000 point value by 100 to obtain a value of 10 in a dollar format. Application 224 may convert the points into any format using any conversion rate or any format conversion policy.

After converting points (or a value in another format) received in a conversion request into a new format, application 224 may transmit the converted transaction data in the new format and/or value to management server 204. Because application 224 may only perform the conversion and transmit the converted data to management server 204 after receiving verification that the request is associated with a valid account, application 224 can avoid sending signals with financial data or other personal information across a network that can be accessed by eavesdroppers or other malicious third parties in instances in which the account identifier cannot be verified.

Management server 204 may include a processing circuit 226. Processing circuit 226 may include a processor 228, a memory 230, and a network interface 232, in some embodiments. Processing circuit 226, processor 228, memory 230, and network interface 232 may be or comprise similar components to processing circuit 214, processor 216, memory 218, and network interface 220 of application server 202. Memory 230 may include an agent 234 and an account interface 236.

Agent 234 may comprise instructions executable by one or more processors (e.g., processor 228) to bridge communication between application 224 and account interface 236. For example, agent 234 may be an application programming interface. Agent 234 may communicate with account interface 236 using ISO 8583 messages or using messages with other electronic message formats. Agent 234 may be configured to receive the account verification request from application 224 and forward the request to account interface 236 for verification. Agent 234 may receive the result of the verification and transmit the result to application 224. If the result indicates a successful verification, agent 234 may receive, from application 224, an update request including the transaction data, the account identifier, and the institution identifier and forward the request to account interface 236 for further processing.

Account interface 236 may comprise instructions executable by one or more processors (e.g., processor 228) to verify whether account identifiers are associated with active valid accounts. Account interface 236 may store, in memory 230, a database of user accounts for institutions 206 and 208 and any number of other institutions. The database may include information about the user accounts such as the status of the user accounts (e.g., active, inactive, valid, invalid, in overdraft, restricted, good standing, etc.). To verify the account identifier that account interface 236 receives in the verification request from application 224 (e.g., via agent 234), account interface 236 may identify the institution associated with the institution identifier included in the request and the database or data storage area of memory 230 that is dedicated to the institution based on the institution identifier matching a corresponding identifier associated with the database or storage area. Account interface 236 may compare the account identifier to the storage area for the institution and determine if there is a valid active account associated with the account identifier. For example, account interface 236 may determine there is not a stored matching valid active account for the identifier if account interface 236 is not able to identify a matching identifier in the searched area, if the status indicator associated with a matching user account indicates the user account is no longer active, or if the status indicator associated with a matching user account is associated with a 'restricted' setting that indicates the respective user account is not eligible to receive deposits or be the subject of a data format conversion.

In some embodiments, account interface 236 may determine whether there is an active account associated with the identifier and institution by transmitting a request comprising the account identifier to the identified institution (e.g., to a processor of the identified institution via a pre-established connection, as described below). In such embodiments, the institution may compare the received account identifier to a database or other area in memory to determine if the account identifier is associated with an active account similar to account interface 236 as described above. Upon determining whether the account identifier is associated with an active account, the institution may transmit a signal back to account interface 236 indicating the determination.

If account interface 236 determines there is an active valid account associated with the identifier, account interface 236 may transmit a signal back to application 224 indicating the account identifier is verified, otherwise, account interface 236 may transmit a signal back to application 224 indicating the account identifier could not be verified. Thus, in contrast to ACH computing networks in which transaction data and other personal information is sent to the ACH network with an ACH file before or without any verification, account interface 236 may confirm that there is a valid account associated with the conversion request before receiving and transmitting any transaction data (or other personally identifiable information) to one of institutions 206 or 208, increasing the security of performing data conversions against eavesdroppers or other malicious parties seeking to intercept communications for such transactions.

In some embodiments, account interface 236 or a processor of one of institutions 206 or 208 may determine whether the account identifier is associated with multiple user accounts or a number of user accounts exceeding a threshold (e.g., a predetermined threshold). Such may be the case when a user has multiple accounts (e.g., savings and checking) with the same institution or accounts with multiple institutions. Account interface 236 or the processor may make the determination by scanning the relevant database or storage area in memory and determining whether there are more than one user accounts associated with the account identifier received in the verification request. If account interface 236 or the processor (via account interface 236) determines the account identifier is only associated with one account or a number of accounts below a threshold, account interface 236 or the processor may transmit a signal back to application 224 indicating verification was successful as described above. However, responsive to identifying more than one account or a number of accounts exceeding a threshold, account interface 236 or the processor may transmit a signal back to application 224 indicating the verification was successful with a flag indicating the identifier is associated with multiple accounts and a list identifying each of the accounts.

In instances in which account interface 236 or the processor identifies multiple accounts or a number of accounts above a threshold and transmits a signal back to application 314 including a list of accounts, application 314 may receive the list and, responsive to identifying the flag, forward the list back to the client device that initially sent the conversion request (e.g., client device 210 or client device 212) for display. A user at the respective client device may view the list and select a user account from the list to indicate the account the user wishes to update with the converted data (e.g., the account in which the user wishes to deposit money). The client device may transmit an indication of the user's selection to application 314, which in turn may forward the selection back to account interface 320 to send an indication to the relevant institution to update the selected account with the converted data.

Account interface 236 may establish connections with institutions 206 and 208 and any other institutions. For example, application account interface 236 may establish transmission control protocol (TCP) connections with institutions 206 and 208 and leave the connections open (in some instances while sending keep-alive packets to institutions 206 and 208 at set intervals for any idle communication periods) to enable account interface 236 to quickly initiate data conversions with institutions 206 and 208 without needing to re-establish a new connection for each conversion. Account interface 236 may establish and maintain connections with any number of institutions 206 and 208 so account interface 236 can quickly initiate transactions such as account updates originating from conversion requests in real-time without re-establishing connections with any institutions.

Institutions 206 and 208 may be any institutions that store data for user accounts and perform account updates. In one example, institutions 206 and 208 may be credit unions or banks that store money and update users' accounts based on converted data that institutions 206 or 208 receive as a result of a data conversion request. Institution 206 may perform or receive a converted value from account interface 236 and update a respective account using a processing circuit 238, which may comprise a processor 240, a memory 242, and a network interface 244, and institution 208 may similarly receive converted values and update accounts accordingly using a processing circuit 246, a processor 248, a memory 250, and a network interface 252. Each of components 238-252 may be similar to the corresponding components 214-220 of application server 202.

Upon verifying an account identifier and subsequently receiving an update request for a user account associated with the account identifier, account interface 236 may identify an institution (e.g., institution 206 or institution 208) from the institution identifier included in the update request and select the pre-established connection with the institution based on the identifier. Account interface 236 may generate and transmit a message including the account identifier and the converted transaction data to the institution to initiate an account update with the converted data. Institution 206 or 208 may update the user's account based on the converted data (e.g., aggregate a value (e.g., a dollar amount) of the converted data with a stored value associated with the user's account) and propagate a signal back to client device 210 through account interface 236 and, in some cases, application 224 indicating the update was successful. Client device 210 may receive the indication and display an indication of the successful update on the user interface. Further, client device 210 may display the new value for the user account on the web page associated with the user account and/or the respective institution.

Data conversion system 200 may enable multiple client devices to convert data through institutions using the systems and methods described herein. For example, client device 212 may access the same points system login page that client device 210 accessed to request a data conversion and submit a data conversion request to the same or a different institution through application server 202 and management server 204. To access the points system login page, client device 210 may log in to a web page associated with the same or a different institution and select a link to the points system login page. Client device 210 may submit an identifier of the different institution and the account identifier of an account of the institution with the data conversion request that application server 202 and management server 204 may use to authenticate the user and perform the data conversion and account update. Because management server 204 has pre-established connections and stores user account data for multiple institutions and user accounts, data conversion system 200 may facilitate the data conversion for the data conversion request through a different institution. Data conversion system 200 may perform such conversions for any number of user accounts and institutions and do so while bypassing typical ACH batch-based processing and avoiding the data security flaws and other technical problems of such systems.

Figure 3:
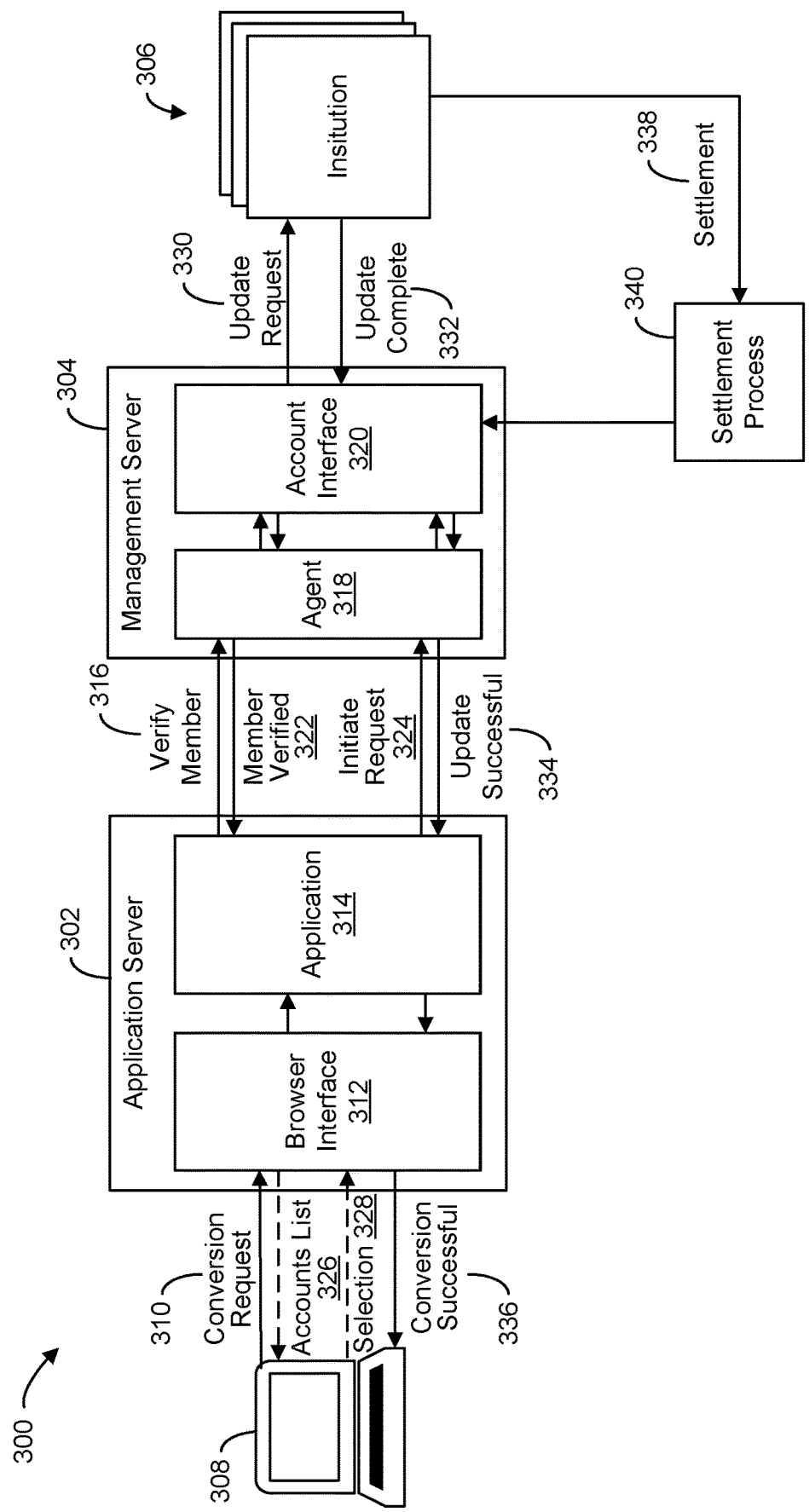
FIG. 3 is an example flow diagram for real-time data conversion using a data conversion system, in accordance with some embodiments of the present disclosure.

Referring now to FIG. 3, an example flow diagram of a process 300 for real-time data conversion using a data conversion system is shown, in accordance with some embodiments of the present disclosure. Process 300 can be performed by a data processing system (e.g., data conversion system 200, shown and described with reference to FIG. 2). For example, process 300 may be performed by an application server 302, a management server 304, institutions 306, and/or client device 308, as illustrated in FIG. 3. Process 300 may include more or fewer operations and the operations may be performed in any order by any device. Performance of process 300 may enable the data processing system to use two applications that interface with each other after one of the applications has received a request for a data conversion to facilitate the data conversion. After one application receives a request, the other application may verify that the user that initiated the request has a valid account and use an established connection that the application has with an institution to complete the conversion. The technical benefits of this process include avoiding clearinghouse processing, which can often take days, and enabling data conversions to occur in real-time with an added layer of security of verifying users are associated with valid user accounts before providing institutions or other third parties with any of the users' financial data. Further, the process enables a set of processors to use an account identifier and an institution identifier to verify an account associated with the account identifier to perform the data conversion and to select the institution to update the account based on the converted data. By performing process 300 to complete a data format conversion instead of using an ACH process, a system may minimize the amount of data that needs to be processed by avoiding transmitting signals and avoiding the above described technical problems inherent to batch processing that clearinghouse processors use by processing the data in real-time on a transaction-by-transaction basis.

In an operation 310, client device 308 may transmit a conversion request to application server 302. Client device 308 can include or execute browser applications to access web pages of institutions (e.g., financial institutions) and data conversion systems over a network (e.g., over the Internet). For example, client device 308 may execute a browser application to log in to a user's card account to view financial data about the user's card transactions on a user interface. The user may have accrued a number of points for the card account through various purchases. To access and use these points, the user may select an option on the user interface to access a points system and log in to the points system using the user's credentials. From the points system web page, the user may select options to convert the points (or data in another format) to money or other formats and select the account. Upon receiving a user selection, the client device may send a conversion request including transaction data, an identifier of an institution, an account identifier (e.g., an account number, a routing number, a card number, or any other number by which the user account associated with the account identifier may be individually identified) of the user account that initiated the conversion or the user account with the points system, etc., to application server 202 to complete the conversion.

A browser interface 312 of application server 302 may be configured to receive the conversion request from client device 308 and send a signal to an application 314 of application server 302 indicating the request and the data included in the request. Application 314 may receive the request from browser interface 312 and transmit the user account identifier and the institution identifier to management server 304 for verification in an operation 316. An agent 318 of management server 304 may receive the user account identifiers and the institution identifier and forward the identifiers to an account interface 320 of management server 304 for further processing.

Account interface 320 may receive the identifiers and determine whether there is an active account associated with the account identifier and the institution identifier. To do so, account interface 320 may identify a database or a data storage area of management server 304 that has stored account information about the institution associated with the institution identifier. Account interface 320 may use the institution identifier as a look-up to identify the database or data storage area. Upon identifying the database or data storage area, account interface 320 may compare the account identifier to the database or data storage area in a second look-up step to determine if there are matching or corresponding user accounts associated with the account identifier. Responsive to account interface 320 not being able to identify a matching user account based on the account identifier, account interface 320 may transmit, via agent 318, a signal back to application 314 indicating an account could not be found or that the account identifier is not associated with an active user account. Responsive to finding a matching user account, account interface 320 may identify an account status (e.g., active, inactive, or restricted) associated with the account. If account interface 320 determines the matching account is associated with an inactive or restricted account status, account interface 320 may transmit a message back to application 314 indicating the account identifier is not associated with a valid active account. However, if account interface 320 determines the matching account is associated with a valid active account, in operation 322, account interface 320 may transmit a signal back to application 314 indicating the identified active account is in good standing.

Application 314 may receive the account verification status (e.g., the indication of whether there is a matching active account in good standing to the account identifier) and determine whether to convert the transaction data into the new format identified in the conversion request. For example, responsive to receiving an indication from account interface 320 that there is not an active user account associated with the account identifier, application 314 may transmit a signal back to client device 308 indicating the conversion was unsuccessful. However, responsive to receiving an indication that there is a valid (e.g., active) user account associated with the account identifier, application 314 may convert the transaction data in the conversion request into the new format.

For example, application 314 may convert at least a portion of the transaction data (the value and/or format) from a first format (e.g., points) into a second format (e.g., dollars and/or cents) based on the second format identified in the conversion request. For instance, application 314 may identify a format to convert points of the transaction data into from the transaction data or from a format identifier included in the data conversion request. Application 314 may retrieve a format conversion policy from memory. Application 314 may convert the points in the transaction data to the new format according to the conversion rates of the retrieved format conversion policy and, in operation 324, application 314 may transmit a signal including the converted data, the account identifier, and the institution identifier to account interface 320 to initiate an update request.

In some embodiments, account interface 320 may determine whether the account identifier is associated with multiple user accounts or a number of user accounts exceeding a threshold (e.g., a predetermined threshold). An account identifier may be associated with multiple accounts when the user that initiated the conversion request has multiple accounts (e.g., savings and checking) with the same institution or accounts with multiple institutions. Account interface 320 may make the determination by scanning the relevant database or storage area in memory and determining whether there are more than one user accounts associated with the account identifier received in the verification request. If account interface 320 determines the account identifier is only associated with one account or a number of accounts below a threshold, account interface 320 may transmit a signal back to application 314 indicating verification was successful in operation 322, as described above. However, if account interface 320 determines the account identifier is associated with more than one account or a number of accounts exceeding a threshold, account interface 320 may generate and include a list of identifiers of each of the accounts along with a flag indicating the identifier is associated with multiple accounts in the signal that account interface 320 transmits to application 314 in operation 322.

In instances in which account interface 320 or the processor identifies multiple accounts or a number of accounts above a threshold and transmits a signal back to application 314 including a list of accounts, application 314 may receive the list and identify the flag. Responsive to identifying the flag, in operation 326, application 314 may forward the list to client device 308 for display. A user at client device 308 may view the list and select a user account from the list to indicate the account the user wishes to update with the converted data (e.g., the account in which the user wishes to deposit money). In operation 328, client device 308 may transmit an indication of the user's selection (e.g., an identifier of the selected account) to application 314, which, in operation 324, may forward the selection back to account interface 320 to initiate the update request.

Account interface 320 may establish connections with institutions 306 and any other institutions. For example, account interface 320 may establish transmission control protocol (TCP) connections with institutions 306 and leave the connections open (in some instances while sending keep-alive packets to institutions 306 at set intervals for any idle communication periods) to enable account interface 320 to quickly initiate data conversions with institutions 306 without needing to re-establish a new connection for each conversion. Account interface 320 may establish and maintain connections with any number of institutions 306.

Upon verifying a user account and subsequently receiving an update request for the user account, account interface 320 may identify an institution from institutions 306 based on the institution identifier included in the update request and select the pre-established connection with the institution based on the identifier. In operation 326, account interface 320 may transmit an update request to the respective institution to update the selected account with the converted amount. The institution may receive the request, update the account with the converted amount (e.g., aggregated the converted amount with a value that is associated with the account), and, in operation 332, transmit a signal back to account interface 320 indicating the update is complete. Account interface 320 may receive the signal and, in operation 334, transmit a signal to application 314 indicating the update was successful.

In operation 336, application 314 may generate a record indicating the conversion request was successful and transmit a signal including the record back to client device 308. Client device 308 may present the record on a user interface (e.g., on a web page) to show the user the conversion was successful. In operation 338, the institution may perform an end-of-day settlement process 340 finalizing the account update (e.g., a deposit) and confirming that information in the user's account went through correctly. The institution may send a signal indicating that the settlement was successful to account interface 320, in some embodiments, so account interface 320 may update its records. For example, account interface 320 may receive the signal and update its records to indicate the account is no longer in overdraft or is active in response to the signal from the institution.

Figure 4:
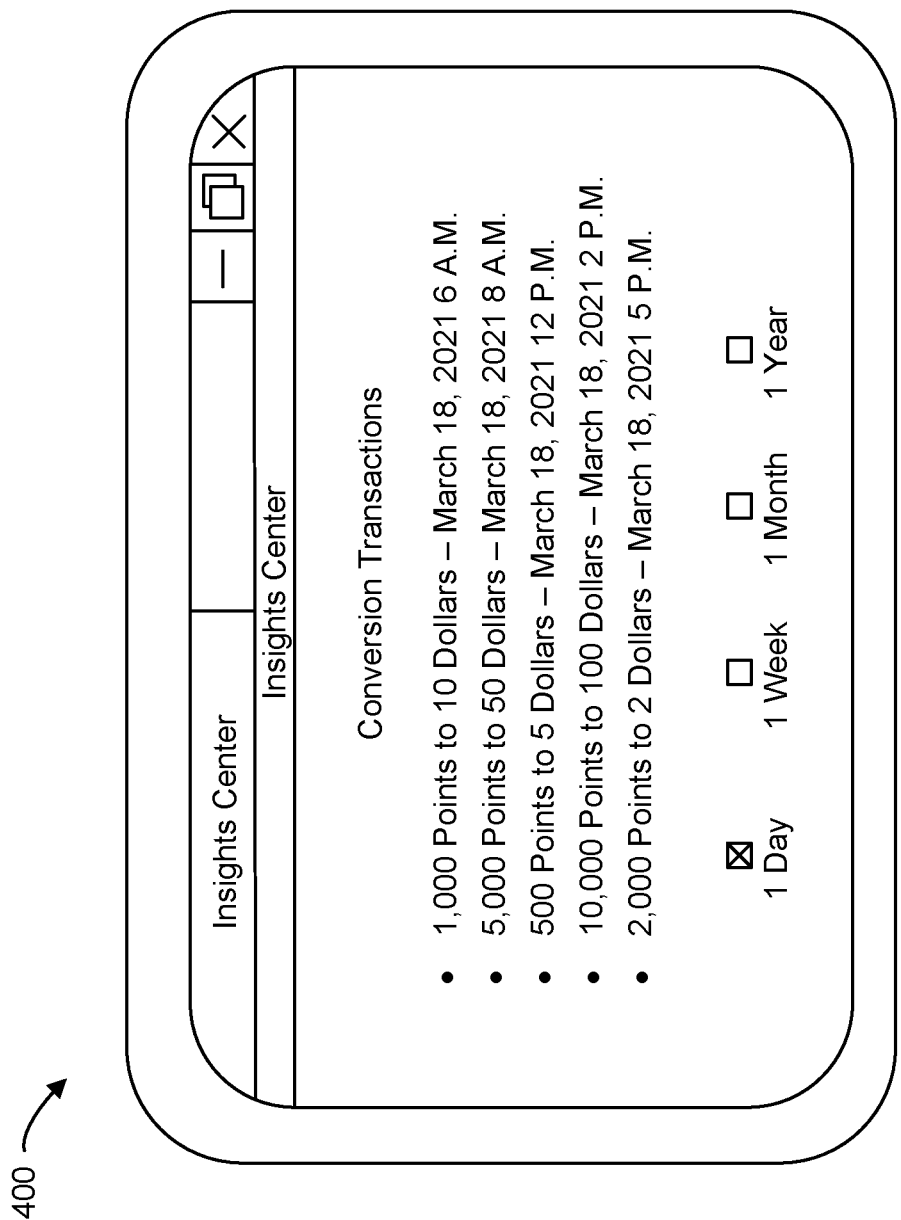
FIG. 4 is an example illustration of an insights center user interface for providing transaction feedback and reporting, in accordance with some embodiments of the present disclosure.

Referring now to FIG. 4, an example illustration of an insights center user interface 400 for providing transaction feedback is shown, in accordance with some embodiments of the present disclosure. User interface 400 is shown to include a list of conversion transactions that a user performed during a day. While only conversion transactions are shown for a one-day time period, user interface 400 may show conversion transactions for any time period between any dates. A user may access user interface 400 via a points system web page that shows information about the user's points account. The user may use user interface 400 to view this web page to ensure there were not any problems with the conversion transactions that went through and that each such transaction went through correctly.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A method, comprising:

receiving, by a first server and from a client device, a request for a data format conversion, the request comprising transaction data, an institution identifier, and a first account identifier identifying a first user account of a user;

prior to receiving the request for a data format conversion, presenting, by the first server, a first web page on a display of the client device in response to a user selection on a second web page, the user previously authenticated to access the second web page using the first user account, wherein receiving the request for a data format conversion comprises receiving the request from the first web page;

responsive to receiving the request, transmitting, by the first server, a verification request comprising the institution identifier and the first account identifier to a second server, receipt of the verification request causing the second server to determine whether the first account identifier and the institution identifier are associated with a valid user account;

after the second server determines the first account identifier is associated with a valid user account, receiving, by the first server from the second server, verification that the first account identifier is associated with a valid user account;

responsive to receiving the verification, converting, by the first server, a portion of the transaction data from a first format to a second format identified in the request for a data format conversion;

transmitting, by the first server, an update request to the second server, the update request comprising the converted transaction data, the institution identifier, and the first account identifier or a second account identifier of a second user account associated with the user, receipt of the update request causing the second server to (1) select an established connection with an institution from a plurality of established connections with institutions based on the institution identifier, and (2) initiate an update transaction with the institution based on the converted transaction data;

receiving, by the first server, an indication that the update transaction was successful; and responsive to receiving the indication, generating, by the first server, a record indicating the update transaction was successful.

2. The method of claim 1, further comprising:

receiving, by the first server, a first request for a data format conversion, the first request comprising first transaction data, a first institution identifier, and a third account identifier;

responsive to receiving the first request, transmitting, by the first server, a first verification request comprising the first institution identifier and the third account identifier to the second server, receipt of the first verification request causing the second server to determine whether the third account identifier is associated with a valid user account;

after the second server determines the third account identifier is not associated with a valid user account, receiving, by the first server from the second server, an indication that verification of the third account identifier was unsuccessful; and responsive to receiving the indication, generating, by the first server, a first record indicating the verification was unsuccessful.

3. The method of claim 2, wherein the second server determines the third account identifier is not associated with a valid user account responsive to determining the third account identifier is not associated with a user account, is associated with an inactive user account, or is associated with a restricted account.

4. The method of claim 1, wherein the second server determines whether the first account identifier is associated with a valid user account by comparing the first account identifier to a database comprising account information corresponding to a plurality of user accounts.

5. The method of claim 1, further comprising:

presenting, by the first server, the first web page on a display of a first client device;

receiving, by the first server and from the first client device, a first request for a first data format conversion, the first request comprising first transaction data, a first institution identifier, and a third account identifier;

converting, by the first server, a portion of the first transaction data from the first format to the second format;

transmitting, by the first server, a first update request to the second server, the first update request comprising the converted first transaction data, the first institution identifier, and the third account identifier, receipt of the first data format conversion request causing the second server to (1) select a first established connection with a first institution from the plurality of established connections with institutions based on the first institution identifier, and (2) initiate a first update transaction with the first institution based on the converted first transaction data;

receiving, by the first server, a first indication that the first update transaction was successful; and responsive to receiving the first indication, generating, by the first server a first record indicating the first update transaction was successful.

6. The method of claim 1, wherein receipt of the verification request further causes the second server to:

determine whether the user is associated with more than one user account; and responsive to determining the user is associated with more than one user account, transmit a list of account identifiers for a plurality of user accounts that are associated with the user, the plurality of user accounts comprising the first user account and the second user account, and wherein receiving the verification that the first user account is valid comprises receiving, by the first server, the list of account identifiers, the method further comprising:

presenting, by the first server, at the client device, the list of account identifiers; and receiving, by the first server, a user selection of the first account identifier or the second account identifier, wherein transmitting the update request to the second server comprises transmitting the selected first account identifier or the second account identifier to the second server.

7. The method of claim 1, wherein the indication that the update transaction was successful is a first indication that the update transaction was successful, and wherein the second server receives a second indication that the update transaction was successful from one or more first processors of the institution, and transmits the first indication that the update transaction was successful to the first server.

8. The method of claim 1, wherein converting the portion of the transaction data from a first format to a second format identified in the request for a data format conversion comprises converting the portion of the transaction data from a first value into a second value; and wherein the institution updates a third value of the first user account based on the second value.

9. A non-transitory computer-readable storage medium storing executable instructions that, when executed by a first server connected to a communications network, cause the first server to:

receive, from a client device, a request for a data format conversion, the request comprising transaction data, an institution identifier, and a first account identifier identifying a first user account of a user;

prior to receiving the request for a data format conversion, present a first web page on a display of the client device in response to a user selection on a second web page, the user previously authenticated to access the second web page using the first user account, wherein the first server receives the request for a data format conversion by receiving the request from the first web page;

responsive to receiving the request, transmit a verification request comprising the institution identifier and the first account identifier to a second server, receipt of the verification request causing the second server to determine whether the first account identifier and the institution identifier are associated with a valid user account;

after the second server determines the first account identifier is associated with a valid user account, receive, from the second server, verification that the first account identifier is associated with a valid user account;

responsive to receiving the verification, convert a portion of the transaction data from a first format to a second format identified in the request for a data format conversion;

transmit an update request to the second server, the update request comprising the converted transaction data, the institution identifier, and the first account identifier or a second account identifier of a second user account associated with the user, receipt of the update request causing the second server to (1) select an established connection with an institution from a plurality of established connections with institutions based on the institution identifier, and (2) initiate an update transaction with the institution based on the converted transaction data;

receive an indication that the update transaction was successful; and responsive to receiving the indication, generate a record indicating the update transaction was successful.

10. The non-transitory computer-readable storage medium of claim 9, wherein the instructions further cause the first server to:

receive a first request for a data format conversion, the first request comprising first transaction data, a first institution identifier, and a third account identifier;

responsive to receiving the first request, transmit a first verification request comprising the first institution identifier and the third account identifier to a second server, receipt of the first verification request causing the second server to determine whether the third account identifier is associated with a valid user account;

after the second server determines the third account identifier is not associated with a valid user account, receive, from the second server, an indication that verification of the third account identifier was unsuccessful; and responsive to receiving the indication, generate a first record indicating the verification was unsuccessful.

11. The non-transitory computer-readable storage medium of claim 10, wherein the second server determines the third account identifier is not associated with a valid user account responsive to determining the third account identifier is not associated with a user account, is associated with an inactive user account, or is associated with a restricted account.

12. The non-transitory computer-readable storage medium of claim 9, wherein the second server determines whether the first account identifier is associated with a valid user account by comparing the first account identifier to a database comprising account information corresponding to a plurality of user accounts.

13. The non-transitory computer-readable storage medium of claim 9, wherein the instructions further cause the first server to:

present the first web page on a display of a first client device;

receive, from the first client device, a first request for a first data format conversion, the first request comprising first transaction data, a first institution identifier, and a third account identifier;

convert a portion of the first transaction data from the first format to the second format;

transmit a first update request to the second server, the first update request comprising the converted first transaction data, the first institution identifier, and the third account identifier, receipt of the first update request causing the second server to (1) select a first established connection with a first institution from the plurality of established connections with institutions based on the first institution identifier, and (2) initiate a first update transaction with the first institution based on the converted first transaction data;

receive a first indication that the first update transaction was successful; and responsive to receiving the first indication, generate a first record indicating the first update transaction was successful.

14. A method, comprising:

establishing, by a first server, connections with a plurality of institutions over a communications network;

receiving, by the first server from a second server, a verification request comprising an institution identifier and a first account identifier associated with a first user account of a user, the second server sending the verification request responsive to the second server:

receiving a data format conversion request comprising transaction data, the institution identifier, and the first account identifier from a client device;

prior to receiving the data format conversion request, presenting a first web page on a display of the client device in response to a user selection on a second web page, the user previously authenticated to access the second web page using the first user account, wherein receiving the data format conversion request comprises receiving the data format conversion request from the first web page;

responsive to receiving the verification request, determining, by the first server, whether the first account identifier and the institution identifier are associated with a valid user account;

responsive to determining the first account identifier and the institution identifier are associated with a valid user account, transmitting, by the first server to the second server, verification that the first account identifier and the institution identifier are associated with a valid user account, receipt of the verification causing the second server to convert a portion of the transaction data from a first format to a second format identified in the data format conversion request;

receiving, by the first server and from the second server, an update request, the update request comprising the converted transaction data, the institution identifier, and the first account identifier or a second account identifier of a second user account associated with the user;

responsive to receiving the update request:

selecting, by the first server, an established connection with an institution based on the institution identifier, and initiating, by the first server, an update transaction with the institution based on the converted transaction data;

receiving, by the first server from the institution, a first indication that the update transaction was successful; and responsive to receiving the first indication, transmitting, by the first server, a second indication that the update transaction was successful to the second server.

15. The method of claim 14, further comprising:

receiving, by the first server from a second server, a first verification request comprising a first institution identifier and a third account identifier, the second server sending the first verification request responsive to receiving a first data format conversion request comprising first transaction data, the first institution identifier, and the third account identifier associated with a third user account of a first user from a first client device;

responsive to receiving the first verification request, determining, by the first server, whether the third account identifier and the first institution identifier are associated with a valid user account;

responsive to determining the third account identifier and the first institution identifier are not associated with a valid user account, transmitting, the first server to the second server, a first indication that the third account identifier and the first institution identifier are not associated with a valid user account, receipt of the first indication causing the first server to generate a first record indicating the verification was unsuccessful.

16. The method of claim 15, wherein determining the first account identifier is not associated with a valid user account is performed responsive to determining the first account identifier is not associated with a user account, is associated with an inactive user account, or is associated with a restricted user account.

17. The method of claim 14, wherein determining whether the first user account is valid comprises:

comparing, by the first server, the first account identifier to a database comprising account information corresponding to a plurality of user accounts.

18. The method of claim 14, further comprising:

responsive to receiving the verification request, determining, by the first server, whether the user is associated with more than one user account; and responsive to determining the user is associated with more than one user account, transmitting, by the first server, a list of account identifiers for a plurality of user accounts that are associated with the user, the plurality of user accounts comprising the first user account and the second user account, receipt of the verification causing the second server to:

present, at the client device, the list of account identifiers;

receive a user selection of the first account identifier or the second account identifier; and transmit the update request to the first server by transmitting the selected first account identifier or the second account identifier to the first server.

* * * * *